Sept. 25, 1956   G. L. WILMOT   2,764,290
HINDERED SETTLING SEPARATION APPARATUS
Filed Dec. 2, 1952
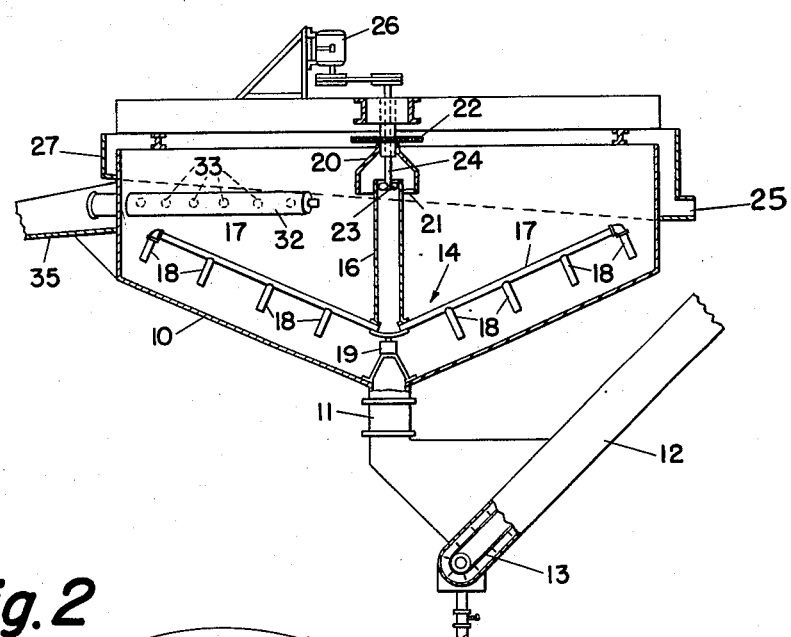
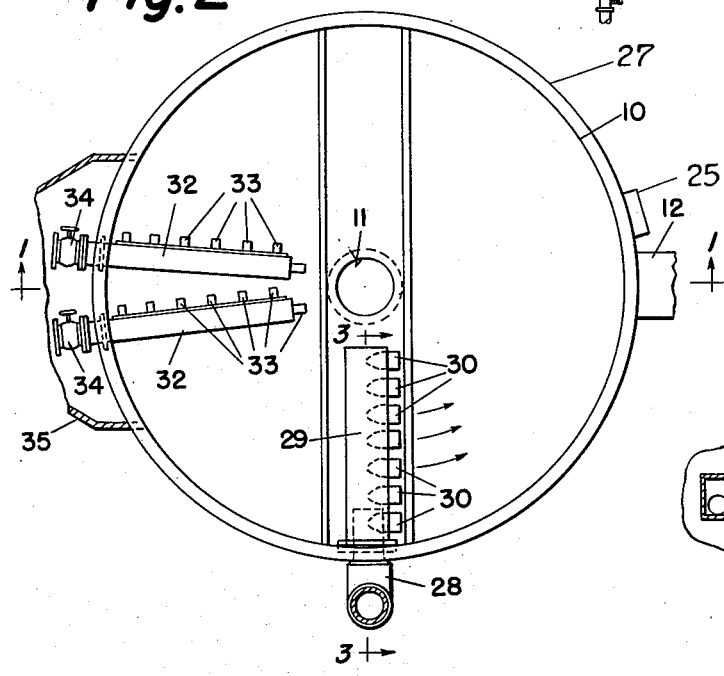
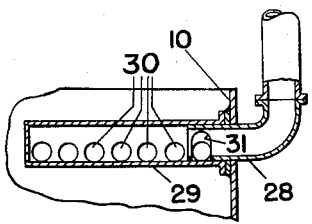
INVENTOR.
GEORGE L. WILMOT
BY John D. Myers
ATTORNEY United States Patent Office 2,764,290
Patented Sept. 25, 1956

2,764,290
HINDERED SETTLING SEPARATION APPARATUS

George L. Wilmot, Hazleton, Pa., assignor to Wilmot Engineering Company, a corporation of Pennsylvania Application December 2, 1952, Serial No. 323,631

7 Claims. (Cl. 209—158)

This invention relates to the cleaning and/or classification of minerals by the hindered settling technique, and pertains more specifically to apparatus for effecting such separation in a rapid, simple and efficient manner.

In cleaning and/or classifying minerals by a hindered settling treatment it is highly advantageous to maintain the upwardly flowing fluid as free as possible from turbulence since the eddies and other current variations characteristic of turbulent flow necessarily affect the settling rate therein and interfere with the separation. My invention represents an improvement over the prior art primarily in providing means for introducing raw feed into the separation apparatus in such a manner that the least possible turbulence results. Broadly speaking, I achieve this objective by inducing a horizontal component in the upwardly flowing current of the liquid separating medium, and introducing the raw feed horizontally into the apparatus in the direction of the said horizontal component.

Another object of the invention is to provide a hindered settling separation apparatus of the above description having an intermediate product recovery manifold at a level below the surface of the separating medium, and having means for introducing raw feed into the apparatus at substantially the same level, whereby the desired intermediate product travels to the recovery manifold without substantial change in level in the medium, while sink and float products of the feed separate therefrom in usual manner.

A further object is to provide a sub-surface feeder for a hindered settling separation apparatus which feeder is adjustable to introduce the raw feed at a desired level of stratification of its constituents in the fluid mass.

A still further object is to provide separation apparatus of the above description having a sub-surface intermediate product recovery means, which means is adjustable to recover a product from a plurality of levels adjacent a given level of stratification.

Other objects and advantages of my invention will become apparent from the following description taken in connection with the accompanying drawing wherein:

Fig. 1 is a vertical sectional view, partly in elevation, of one form of apparatus embodying my invention, and taken generally along the line 1—1 of Fig. 2;

Fig. 2 is a plan view of the apparatus illustrated in Fig. 1 with certain details omitted for purpose of clarity; and Fig. 3 is a sectional view taken along the line 3—3 of Fig. 2 looking in the direction of the arrows.

It will be understood that although my invention is well adapted for use in connection with the cleaning and classification of fine coal, and hence the illustrated embodiment will be described as thus employed, this is but one of various possible applications which will become apparent from the following specification.

Referring to the drawing, wherein similar numerals indicate similar parts throughout the several views, the numeral 10 indicates a separation vessel, which is preferably generally cylindrical, having a lower discharge duct 11 for sink product communicating in conventional manner with a conveyor casing 12 which contains a flight conveyor 13 by which the sink product is removed from the apparatus.

Mounted concentrically in the vessel 10 is an hydraulic agitator shown generally at 14 and comprising a hollow vertical casing 16 from which extend a plurality of radial branches 17 each of which is provided with a plurality of downwardly directed discharge nozzles 18. The agitator is supported from below by a bearing 19, and is maintained in vertical position by means of a hood 20 connected concentrically to the casing 16 by means of a spider 21. The hood 20 is rigidly connected concentrically to a sprocket 22 suitably mounted above the vessel 10 and driven by any convenient driving means whereby the agitator may be rotated in the vessel 10 at any desired speed. Circulation of the liquid separating medium through the agitator 14 is provided by an impeller 23 positioned within the casing 16 and connected by a shaft 24, which passes coaxially through the sprocket 22, to a driving motor 26. A launder 27 having discharge vent 25 surrounds the upper (overflow) lip or edge of the vessel 10 to collect the overflow therefrom which contains the float product of the separation conducted in the vessel, the said lip serving to maintain the surface level of the medium in the vessel.

Raw feed to be cleaned or classified is introduced into the vessel 10 by means of a feed pipe 28 entering a side of the vessel 10 below its upper edge and telescoping into a conduit 29 which projects radially and horizontally into the vessel. A plurality of short nipples or pipes 30 on the conduit project substantially perpendicularly therefrom whereby the raw feed may be introduced into the vessel substantially tangentially to the horizontal circular path followed by the feed and medium in the vessel, as will be more fully described hereinafter. Preferably the nipples 30 intersect the conduit 29 tangentially of its bottom in order to avoid any accumulation of raw feed in the conduit. The conduit is rotatable longitudinally about the horizontal portion of the feed pipe 28, thus permitting raw feed to be discharged from the nipples 30 either toward the top or bottom of the vessel 10, if desired. The portion of the feed pipe 28 which projects into the conduit 29 beyond the nipples 30 is suitably apertured over part of its circumference adjacent the nipples, as shown at 31, to permit free egress of the raw feed through the nipples even when the conduit 29 is rotated a limited amount with respect to the feed pipe 28.

Angularly separated from the feed conduit 29, about the vertical axis of the vessel 10, are a pair of product recovery ducts or manifolds 32 extending horizontally and substantially radially into the vessel 10 below the overflow edge of the vessel and preferably at approximately the same level as the feed conduit. As shown in Fig. 2, the recovery manifolds 32 are disposed about 270° from the feed conduit 29, the angle being determined in the counterclockwise direction from the feed conduit (i. e., in the direction of flow from the nipples 30) but this angle may be varied according to the settling conditions in the vessel. The manifolds 32 are provided with ports or tubular branches 33 directed upstream relative to the flow from the nipples 30, through which ports or tubular branches the manifolds 32 are adapted to remove from the vessel 10 material stratified at the intermediate level at which the manifolds are positioned. Since it is one of the objects of the invention to provide apparatus having means for recovering a product of a defined specific gravity intermediate that of the sink and float products, the inlet openings of the tubular branches 33 of the recovery manifold will of course be situated at the level at which the desired product stratifies in the vessel 10, as determined by the upward flow of the separating medium; and since the specific gravity of the suspended feed varies throughout the depth of the vessel, it is important, in order to recover efficiently the product of desired intermediate specific gravity, that the vertical dimensions of the inlet openings of the tubular branches 33 should amount to only a minor proportion of the depth of the vessel as determined by the overflow lip, as shown in the drawing. Moreover, in order that the desired feed component to be recovered may stratify most expeditiously at the level of the recovery manifolds, for most efficient operation of the apparatus, the feed conduit 29 should also be situated at such level of stratification, and the vertical dimensions of the openings of the nipples 30 preferably also amount to only a minor proportion of the depth of the vessel, as illustrated. It will be understood, however, that the advantage of the sub-surface feed mechanism of the present apparatus in minimizing turbulence in the separating medium is realized even though the vertical dimensions of the openings of the nipples 30 amount to a major proportion of the depth of the separating vessel, or are situated above or below the level of stratification of the desired product in the vessel. As in the case of the feed conduit, the recovery manifolds 32 are rotatable about their longitudinal axes thereby affording a limited degree of selection between the strata adjacent the level of the manifolds from which feed constituents of intermediate specific gravity may be recovered. The material collected by the manifolds 32 is discharged from the ends thereof disposed outwardly of the vessel 10, where valves 34 are provided to control the effluent rate as desired. The effluent is then conducted by a trough 35 to a dewatering shaker screen (not shown) and thence to storage in accordance with conventional practice.

The apparatus of my invention is particularly adapted to be used in cleaning and classifying the final coal product obtained from the breakers at the mine site and, preparatory to its introduction into the apparatus, the raw feed is presized to between 3/64 inch and 48 mesh. In operation, the vessel 10 first being filled with water, the impeller 23 is operated to circulate water through the agitator 14, and the agitator is rotated on its axis—all in accordance with common practice. The discharge of water from the nozzles 18 produces the upward flow throughout the entire horizontal cross-sectional area of the vessel necessary for hindered settling separation, while rotation of the agitator stirs the water in the vessel to impart a horizontal component to the rising current, for example in the direction indicated by the arrows in Fig. 2, the horizontal component being proportional to the speed of rotation of the agitator. The presized feed, mixed with about four times its weight of water, is then introduced into the feed pipe 28, whence it flows through the conduit 29 and emerges from the nipples 30 substantially horizontally into the vessel 10 in the direction of the horizontal component of the current just described, thereby augmenting such horizontal component, which carries the solids suspended therein in a circular path around the tank toward the product recovery manifolds 32.

It may here be said that the proportion of solids in the feed may vary considerably from the 20% indicated above as preferable, but the input volume of raw feed, including its water content, must be kept as nearly constant as possible in order to maintain the desired overflow.

By introducing raw feed through the nipples 30, and downstream relative to the horizontal component of the the separating current, as described, only a bare minimum of turbulence results, the horizontal and vertical streams combining to produce a resultant helical flow whereby the hindered settling mechanism may operate to raise the clay and other light impurities to the overflow while maintaining the desired coal constituent at a substantially constant intermediate level, and at the same time moving the latter stratum in a circular path to the recovery manifolds 32 where it may be removed from the vessel. The heavy slate and rock constituents of the feed are of course too heavy to be borne upwardly or supported by the rising current and these products settle to the bottom of the vessel from which they are removed through the lower discharge duct 11.

In the event that the apparatus is operated without rotation of the agitator 14, which may sometimes become necessary or desirable, the horizontal sub-surface feeding of the raw coal, as described above, will itself induce the horizontal component to the rising current of separating medium, and will of course maintain such horizontal component as raw feed is continuously introduced into the separating vessel downstream with respect to that component.

It will be apparent that numerous advantages are realized by my improved apparatus described above. Inasmuch as the raw feed is introduced substantially horizontally into the cleaning vessel, and over a wide area, turbulence is substantially eliminated, and the rising currents essential to hindered settling separation are not greatly disturbed but simply given a horizontal component which carries the desired intermediate product (coal) to the recovery manifolds. Thus, stratification of the raw feed constituents is not in the least interfered with by the introduction of raw feed. Also, when the raw feed is introduced into the separating vessel at substantially the level at which the desired feed constituent stratifies and is removed, which is the preferred manner of operation of my separation apparatus, it can be readily understood that stratification of the desired constituent will be effected in the shortest possible time, thereby permitting high-capacity operation of the apparatus with corresponding economy in the cost of cleaning the raw mineral feed.

It will be understood that the invention is not intended to be limited to the precise form and arrangement of parts as disclosed herein for the purpose of illustration, but, rather, to embrace modifications thereof falling within the scope of the appended claims.

What I desire to claim is:

1. In a hindered settling separation apparatus including a vessel wherein separation of a mixture of feed components is adapted to be effected by an upward flow of a liquid separating medium, said vessel having an overflow edge for the removal of the float product of said separation, the improvement which comprises means for causing said medium to flow also along a prescribed horizontal path in said vessel, said means including a feed conduit having a discharge opening adapted to introduce said feed components substantially horizontally into said vessel below the level of said overflow edge and along said prescribed path, and a product recovery duct projecting substantially horizontally into said vessel transversely of said path and downstream of said conduit relative to said second mentioned flow, said duct having ports disposed entirely below the level of said overflow edge and opening upstream relative to said second mentioned flow for the removal of feed components of intermediate specific gravity, the vertical dimensions of said ports respectively constituting only a minor proportion of the depth of said vessel as determined by said overflow edge.

2. Apparatus in accordance with claim 1, wherein said product recovery duct is rotatable about its longitudinal axis, whereby feed components of intermediate specific gravity may be selected for recovery from several adjacent strata thereof contiguous to said duct.

3. In a hindered settling separation apparatus including a vessel wherein separation of a mixture of feed components is adapted to be effected by an upward flow of a liquid separating medium, said vessel having an overflow edge for the removal of the float product of said separation, the improvement which comprises means for causing said medium to flow also along a prescribed horizontal path in said vessel, said means including a conduit for said feed components projecting horizontally into said vessel below the level of said overflow edge and transversely of said path, said conduit having a plurality of discharge openings directed substantially horizontally along said path, and a product recovery manifold projecting substantially horizontally into said vessel transversely of said path and downstream of said conduit relative to said second mentioned flow, said conduit and said manifold being disposed at substantially the same level in said vessel, said manifold having ports disposed entirely below the level of said overflow edge and opening upstream relative to said second mentioned flow for the removal of feed components of intermediate specific gravity, the vertical dimensions of said discharge openings and of said ports respectively constituting only a minor proportion of the depth of said vessel as determined by said overflow edge.

4. Apparatus in accordance with claim 3, wherein said conduit and said manifold are rotatable respectively about their longitudinal axes, whereby raw feed may be discharged into said vessel in the direction of the level of stratification of a given constituent of said feed in said medium, and feed constituents of intermediate specific gravity may be selected for recovery from several adjacent strata thereof contiguous to said recovery manifold.

5. A hindered settling separation apparatus comprising a separating vessel for containing a liquid separating medium, means for maintaining an upward flow of said medium in said vessel throughout substantially the entire horizontal cross-sectional area of the latter, means for establishing and maintaining a horizontal component of said flow, an overflow discharge lip in said vessel for removing float product therefrom and for maintaining the surface level of said medium in said vessel, said second mentioned means including a conduit for raw feed to be separated projecting horizontally into said vessel below the level of said lip and substantially transversely of said horizontal component, a plurality of feed pipes branching from said conduit with their discharge openings directed substantially horizontally along said horizontal component, and a product recovery manifold projecting substantially horizontally into said vessel transversely of said horizontal component and downstream of said conduit relative to said second mentioned flow, said conduit and said manifold being disposed at substantially the same level in said vessel, said manifold being provided with tubular branches disposed below the level of said lip having inlet openings directed upstream relative to said horizontal component for the removal of feed constituents of intermediate specific gravity, the vertical dimensions of said discharge openings and of the openings of said tubular branches respectively constituting only a minor proportion of the depth of said vessel as determined by said lip.

6. A hindered settling separation apparatus comprising a generally cylindrical separating vessel for containing a liquid separating medium, means for maintaining an upward flow of said medium in said vessel, means for establishing and maintaining a horizontal component of said flow about the vertical axis of said vessel, said vessel having an overflow discharge lip for removing float product therefrom and for maintaining the surface level of said medium in said vessel, said second mentioned means including a conduit for raw feed to be separated projecting horizontally radially into said vessel below the level of said lip, a plurality of feed pipes branching substantially perpendicularly from said conduit with their discharge openings directed substantially horizontally along said horizontal component, and a product recovery manifold projecting radially and substantially horizontally into said vessel below the level of said lip and angularly spaced from said conduit about said vertical axis, said conduit and said manifold being disposed at substantially the same level in said vessel, said manifold being provided with tubular branches projecting therefrom having inlet openings directed upstream with respect to said horizontal component for the removal of constituents of said feed of intermediate specific gravity, the vertical dimensions of said inlet openings respectively constituting only a minor proportion of the depth of said vessel as determined by said lip.

7. A hindered settling separation apparatus comprising a generally cylindrical separating vessel for containing a liquid separating medium, means for maintaining an upward flow of medium in said vessel, means for establishing and maintaining a horizontal component of said flow about the vertical axis of said vessel, said vessel having an overflow discharge lip for removing float product therefrom and for maintaining the suface level of said medium in said vessel, said second mentioned means including a conduit for raw feed to be separated projecting horizontally radially into said vessel below the level of said lip, a plurality of feed pipes branching substantially perpendicularly from said conduit with their discharge openings directed substantially horizontally along said horizontal component, and a product recovery manifold projecting radially and substantially horizontally into said vessel below the level of said lip and angularly spaced from said conduit about said vertical axis, said conduit and said manifold being disposed at substantially the same level in said vessel, said manifold being provided with tubular branches projecting therefrom having inlet openings directed upstream with respect to said horizontal component for the removal of constituents of said feed of intermediate specific gravity, the vertical dimensions of said discharge openings and of said inlet openings respectively constituting only a minor proportion of the depth of said vessel as determined by said lip.

References Cited in the file of this patent

UNITED STATES PATENTS

| Number | Name | Date |
| --- | --- | --- |
| 762,866 | Allen | June 21, 1904 |
| 1,035,145 | Beeken | Aug. 13, 1912 |
| 1,511,643 | Trent | Oct. 14, 1924 |
| 1,959,212 | Miller | May 15, 1934 |
| 2,347,264 | Holt et al. | Apr. 25, 1944 |
| 2,369,194 | Weber | Feb. 13, 1945 |
| 2,420,180 | Laughlin | May 6, 1947 |